(12) United States Patent
De Smet et al.

(10) Patent No.: US 9,177,017 B2
(45) Date of Patent: Nov. 3, 2015

(54) QUERY CONSTRAINT ENCODING WITH TYPE-BASED STATE MACHINE

(75) Inventors: Bart De Smet, Bellevue, WA (US); Henricus Johannes Maria Meijer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 592 days.

(21) Appl. No.: 12/890,870

(22) Filed: Sep. 27, 2010

(65) Prior Publication Data
US 2012/0079464 A1 Mar. 29, 2012

(51) Int. Cl.
G06F 9/44 (2006.01)
G06F 17/30 (2006.01)
G06F 9/45 (2006.01)

(52) U.S. Cl.
CPC .......... *G06F 17/30427* (2013.01); *G06F 8/427* (2013.01)

(58) Field of Classification Search
None
See application file for complete search history.

(56) References Cited

U.S. PATENT DOCUMENTS

| | | | |
|---|---|---|---|
| 5,047,918 A * | 9/1991 | Schwartz et al. | 1/1 |
| 5,278,978 A * | 1/1994 | Demers et al. | 707/756 |
| 5,566,333 A * | 10/1996 | Olson et al. | 1/1 |
| 5,640,550 A * | 6/1997 | Coker | 717/141 |
| 5,752,034 A * | 5/1998 | Srivastava et al. | 717/130 |
| 5,778,357 A * | 7/1998 | Kolton et al. | 707/603 |
| 5,850,550 A * | 12/1998 | Li et al. | 717/154 |
| 5,920,716 A * | 7/1999 | Johnson et al. | 717/141 |
| 5,956,706 A * | 9/1999 | Carey et al. | 1/1 |
| 6,006,221 A * | 12/1999 | Liddy et al. | 1/1 |
| 6,061,517 A * | 5/2000 | House et al. | 717/115 |
| 6,063,133 A * | 5/2000 | Li et al. | 717/136 |
| 6,289,502 B1 * | 9/2001 | Garland et al. | 717/104 |
| 6,611,955 B1 * | 8/2003 | Logean et al. | 717/128 |
| 6,785,677 B1 * | 8/2004 | Fritchman | 1/1 |
| 7,680,782 B2 | 3/2010 | Chen et al. | |
| 7,984,043 B1 * | 7/2011 | Waas | 707/718 |
| 8,122,006 B2 * | 2/2012 | de Castro Alves et al. | 707/713 |
| 2003/0014734 A1 * | 1/2003 | Hartman et al. | 717/125 |
| 2003/0056205 A1 * | 3/2003 | Miloushev et al. | 717/162 |
| 2003/0212671 A1 * | 11/2003 | Meredith et al. | 707/3 |
| 2004/0186817 A1 * | 9/2004 | Thames et al. | 707/1 |
| 2005/0028134 A1 | 2/2005 | Zane et al. | |

(Continued)

FOREIGN PATENT DOCUMENTS

CN 101233512 A 7/2008
EP 2151772 A1 2/2010

OTHER PUBLICATIONS

Chaudhuri, Surajit, "An Overview of Query Optimization in Relational Systems", Retrieved at << http://citeseerx.ist.psu.edu/viewdoc/download?doi=10.1.1.92.1553&rep=rep1&type=pdf >>, Proceedings of the seventeenth ACM SIGACT-SIGMOD-SIGART symposium on Principles of database systems, Jun. 1-4, 1998, pp. 11.

(Continued)

*Primary Examiner* — Chameli Das
(74) *Attorney, Agent, or Firm* — Brian Haslam; Kate Drakos; Micky Minhas

(57) ABSTRACT

A query specified in a source programming language can be analyzed as a function of a type-based state machine that encodes query constraints of a target programming language. The type-based state machine can encode such constraints as types representing states and methods representing transitions between states or types.

21 Claims, 12 Drawing Sheets

(56) References Cited

U.S. PATENT DOCUMENTS

| | | | | |
|---|---|---|---|---|
| 2005/0183058 | A1* | 8/2005 | Meijer et al. | 717/100 |
| 2006/0070084 | A1* | 3/2006 | Novik et al. | 719/318 |
| 2006/0161833 | A1* | 7/2006 | Chandra et al. | 714/763 |
| 2006/0230029 | A1* | 10/2006 | Yan | 707/3 |
| 2006/0282419 | A1* | 12/2006 | Sen et al. | 707/4 |
| 2007/0027905 | A1 | 2/2007 | Warren et al. | |
| 2007/0112714 | A1* | 5/2007 | Fairweather | 706/46 |
| 2007/0168907 | A1* | 7/2007 | Iborra et al. | 717/100 |
| 2007/0250820 | A1* | 10/2007 | Edwards et al. | 717/131 |
| 2007/0266366 | A1* | 11/2007 | Bucuvalas | 717/104 |
| 2007/0299836 | A1 | 12/2007 | Hou et al. | |
| 2008/0120604 | A1* | 5/2008 | Morris | 717/128 |
| 2008/0275910 | A1* | 11/2008 | Molina-Moreno et al. | 707/103 R |
| 2008/0301124 | A1* | 12/2008 | Alves et al. | 707/5 |
| 2009/0125495 | A1* | 5/2009 | Zhang et al. | 707/4 |
| 2009/0144229 | A1 | 6/2009 | Meijer et al. | |
| 2009/0319496 | A1 | 12/2009 | Warren et al. | |
| 2010/0088672 | A1* | 4/2010 | Langworthy et al. | 717/109 |
| 2010/0198799 | A1* | 8/2010 | Krishnan et al. | 707/702 |
| 2010/0332461 | A1* | 12/2010 | Friedman et al. | 707/687 |
| 2011/0191784 | A1* | 8/2011 | Meijer et al. | 719/318 |
| 2011/0307435 | A1* | 12/2011 | Overell et al. | 706/46 |
| 2012/0060142 | A1* | 3/2012 | Fliess et al. | 717/102 |

OTHER PUBLICATIONS

Box, et al., "LINQ: .NET Language-Integrated Query", Retrieved at << http://msdn.microsoft.com/en-us/library/bb308959.aspx >>, Feb. 2007, pp. 28.

"Standard Query Operators Overview", Retrieved at << http://msdn.microsoft.com/en-us/library/bb397896.aspx , Jul. 28, 2010, pp. 3.

"HXQ: A Compiler from XQuery to Haskell", Retrieved at << http://lambda.uta.edu/HXQ/ >>, Jul. 28, 2010, pp. 4.

Weiner, et al., "FrameworkBased Development and Evaluation of CostBased Native XML Query Optimization Techniques", Retrieved at <<http://www.vldb.org/pvldb/2/vldb09-1053.pdf >>, VLDB, Aug. 24-28, 2009, pp. 6.

Suto, et al., "Performance Trees: A New Approach to Quantitative Performance Specification", Retrieved at << http://citeseerx.ist.psu.edu/viewdoc/download?doi=10.1.1.104.4430&rep=rep1&type=pdf >>, Proceedings of the 14th IEEE International Symposium on Modeling, Analysis, and Simulation, Sep. 11-14, 2006, pp. 11.

"International Search Report", Mailed Date: Mar. 20, 2012, Application No. PCT/US2011/051015, Filed Date: Sep. 9, 2011, pp. 8.

"Notice of First Office Action," Mailed Date: Jan. 7, 2013, Application No. 201110306389.9, Filed Date: Sep. 27, 2010, pp. 10.

"Response to First Office Action," Mailed Date: Feb. 7, 2013, Application No. 201110306389.9, Filed Date: Sep. 27, 2010, pp. 6.

"Notice of Second Office Action," Mailed Date: Jun. 20, 2013, Application No. 201110306389.9, Filed Date: Sep. 26, 2011, pp. 10.

"Response to Second Office Action," Mailed Date: Sep. 3, 2013, Application No. 201110306389.9, Filed Date: Sep. 26, 2011, pp. 3.

"Notice of Third Office Action," Mailed Date: Jan. 8, 2014, Application No. 201110306389.9, Filed Date: Sep. 26, 2011, pp. 9.

"Response to Third Office Action," Mailed Date: Mar. 21, 2014, Application No. 201110306389.9, Filed Date: Sep. 26, 2011, pp. 6.

"Final Rejection," Mailed Date: Jul. 16, 2014, Application No. 201110306389.9, Filed Date: Sep. 26, 2011, pp. 13.

"Request for Reexamination," Mailed Date: Oct. 31, 2014, Application No. 201110306389.9, Filed Date: Sep. 26, 2011, pp. 13.

* cited by examiner

US 9,177,017 B2

QUERY CONSTRAINT ENCODING WITH TYPE-BASED STATE MACHINE

BACKGROUND

Data processing is a fundamental part of computer programming. One can choose from amongst a variety of programming languages with which to author programs. The selected language for a particular application may depend on the application context, a developer's preference, or a company policy, among other factors. Regardless of the selected language, a developer will ultimately have to deal with data, namely querying and updating data.

A technology called language-integrated queries (LINQ) was developed to facilitate data interaction from within programming languages. LINQ provides a convenient and declarative shorthand query syntax to enable specification of queries within a programming language (e.g., C#®, Visual Basic® . . . ). More specifically, query operators are provided that map to lower-level language constructs or primitives such as methods and lambda expressions. Query operators are provided for various families of operations (e.g., filtering, projection, joining, grouping, ordering . . . ), and can include but are not limited to "where" and "select" operators that map to methods that implement the operators that these names represent. By way of example, a user can specify a query in a form such as "from n in numbers where n<10 select n," wherein "numbers" is a data source and the query returns integers from the data source that are less than ten. Further, query operators can be combined in various ways to generate queries of arbitrary complexity.

While queries can be executed locally over in-memory data, the queries can also be remoted, for example, to another computer for execution. In this scenario, a query is represented as data rather than code. This data representation of a query (e.g., expression tree) can subsequently be translated to target any data source. For example, a language-integrated query can be translated into SQL (Structured Query Language) for execution by a relational database system. As another example, a data representation of a language integrated query can translated into XQuery to enable execution with respect to XML (eXtensible Markup Language) data.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to query constraint encoding with a type-based state machine. Query constraints associated with a target programming language (e.g., query language) including at least syntax restrictions can be captured by a type-based state machine that encodes states as types and transitions between states as methods. The type-based state machine can be employed to provide compile-time checking and program development assistance with respect to queries specified in a source programming language ultimately destined to be translated to a target programming language.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward capturing constraints of a target query language and subsequently employing the constraints to limit the expressiveness of a source, language-integrated query to what the target query language can support. Language-integrated queries conventionally allow for unbounded composition of query operators. However, many external query languages targeted through this syntax (e.g., via runtime translation) do not offer similar flexibility. Consequently, programmers are given a false sense of expressiveness since there are a large number of queries that compile well in the source language but do not have a meaningful translation into a target query language thereby often causing runtime exceptions. This problem is addressed by capturing constraints of a target language and enforcing these constraints on language-integrated query expressiveness by way of compile-time checking.

More specifically, query language semantics including a grammar and type system can be encoded in a state machine that can be employed to facilitate compile time checking. The state machine can be type based in which states are encoded as types and transitions between states are encoded as methods. In this manner, the state machine can capture supported query operators and patterns of query operators, among other things. At compile time, the state machine can be utilized to detect invalid queries. Similarly, the state machine can be employed to aid provisioning of feedback during query specification including error identification and code completion suggestions.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
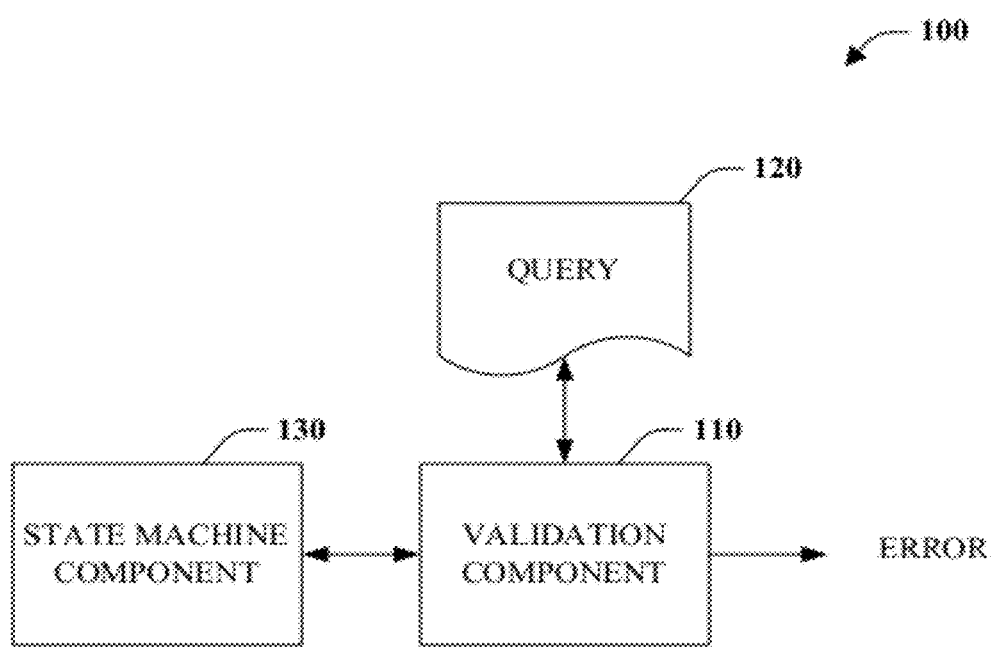
FIG. 1 is a block diagram of a query validation system.

Referring initially to FIG. 1, a query analysis system 100 is illustrated. The query analysis system 100 includes a validation component 110 that is configured to receive, retrieve, or otherwise obtain or acquire a query 120. For example, the query 120 can correspond to a language-integrated query (LINQ query), amongst other types of queries. The validation component 110 checks or validates the query 120 as a function of a state machine component 130 (also referred to herein simply as a state machine), which captures constraints of a target query language including but not limited to supported query operators and patterns of query operators (e.g., limits on the number of occurrences of query operators and relative ordering of query operators), for example. In accordance with one embodiment, the state machine component 130 can be type-based state machine that captures constraints as types and methods as discussed further hereinafter. If the query 120 is determined not to respect the constraints of a target query language, for example, if an invalid query operator or invalid pattern of query operators is detected, the validation component 110 can signal an error. In accordance with one embodiment, the validation component 110 can perform compile-time checking of the query 120 thus mitigating the risk of runtime failure. Accordingly, the validation component 110 can form part of a program language compiler.

Figure 2:
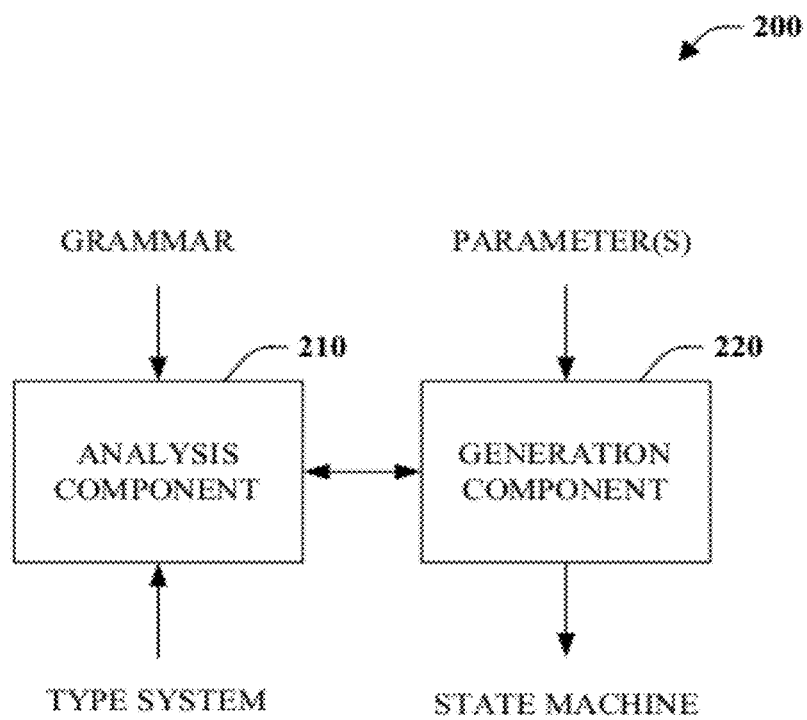
FIG. 2 is a block diagram of a state-machine generation system.

FIG. 2 depicts a state-machine generation system 200 including an analysis component 210 and a generation component 220. The analysis component 210 can analyze target query-language semantics (or in other words, a language specification) including a grammar and a type system to determine constraints, or in other words restrictions on the target query language, wherein the grammar describes acceptable syntax and the type system describes proper usage of data types. Based on the analysis, the generation component 220 can produce a state machine (e.g., state machine component 130) that captures constraints on the target query language. In accordance with one embodiment, the state machine can be type-based, or stated differently the generation component 220 can produce a state machine of types. In this case, states can be encoded as types and transitions between states can be encoded as methods. The generation component 220 can also receive one or more parameters indicating a desired size and/or complexity of a generated state machine (e.g., to prevent denial of service (DOS) attacks). As a result, the state machine can include all constraints specified by the grammar and type system, a subset of the constraints, or even a superset of the constraints (more constraints than specified by the grammar and type system).

Figure 3A:
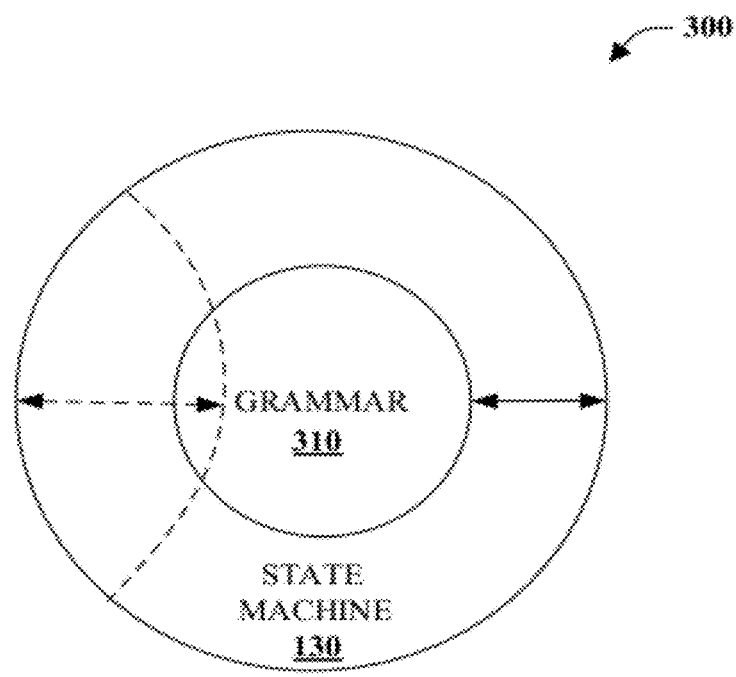
FIG. 3A is a graphical illustration of constraint variations.

Turning briefly to FIG. 3A a graphical representation of constraint variations 300 is depicted. Here, the inner circle corresponds to constraints dictated by a grammar 310 and/or type system, for example, and the outer circle represents constraints captured by a state machine. The distance between the inner and the outer circles represents a difference in constraints specified by the grammar 310 and state machine 130. The state machine 130 can be adjusted to include more or less constraints based on a myriad of factors including but not limited to a particular version of the state machine component 130 and/or payment of a fee. For example, a premium version of a system for generating type-based state machines can produce a state machine that includes substantially all target program language constraints specified by the grammar 310 while other versions may offer less coverage, for example. Note also, that the state machine 130 can impose more constraints than the grammar as illustrated by the dashed lines to further mitigate risk of runtime errors.

Figure 3B:
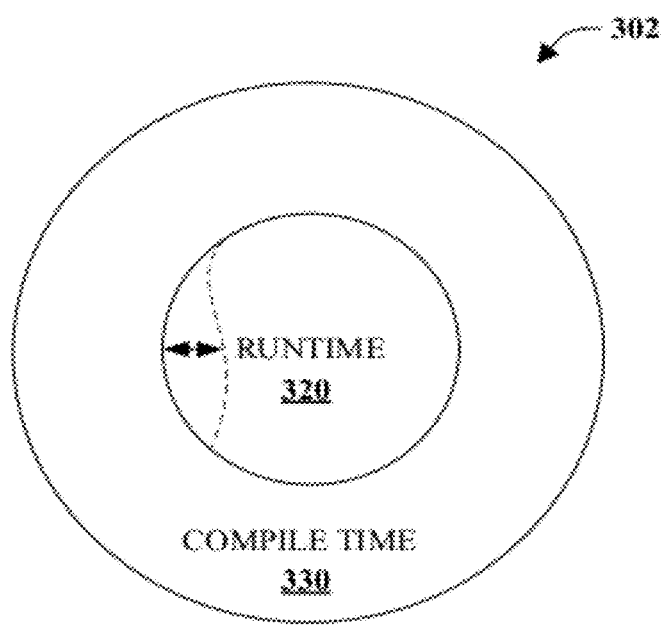
FIG. 3B is a graphical illustration of a query checking times.

FIG. 3B is a graphical representation of query checking times 302 to aid clarity with respect to aspects of the disclosure. A query can be checked for conformance with respective constraints either at runtime 320 or at compile time 330. If a query does not conform to constraints at runtime 320, a computer program can crash and/or return unexpected results. Accordingly, the more checking that can be done at compile time 330 the better. As illustrated by the dashed lines, checking that is conventionally performed at runtime 320 can also be done at compile time 330 to improve program safety. Conventionally, language-integrated queries were checked solely at runtime 320 and resulted in a large amount of runtime errors. By adding compile-time checking of the language-integrated queries using a state machine as described herein, runtime errors can be mitigated.

Figure 4:
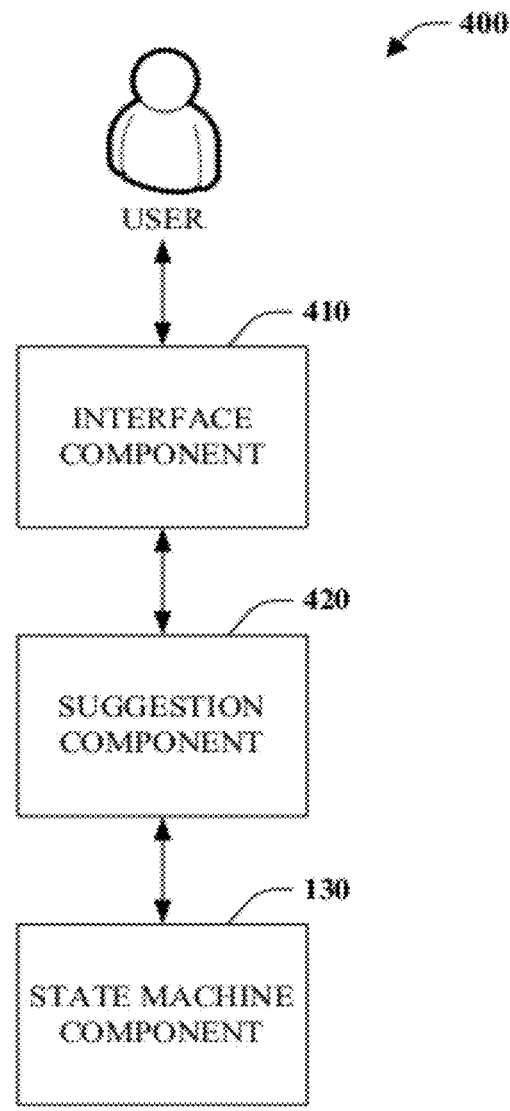
FIG. 4 is a block diagram of a system that facilitates query specification.

FIG. 4 illustrates a system 400 that facilitates programming. More particularly, the system can aid specification of queries such as those specified in a first language and translated for execution in a second language. As depicted, the system 400 includes an interface component 410 with which a user can employ to specify queries. For example, the interface component 410 can correspond to a code editor alone or as part of an integrated development environment (IDE). Communicatively coupled with the interface component 410 is a suggestion component 420. The suggestion component 420 provides suggestions to a user as the user is specifying queries via the interface component 410. For example, code completion functionality can be provided. Information regarding suggestions with respect to queries can be provided as a function of the state machine component 130. As previously described, the state machine component 130 can capture constraints associated with a target query language such as those provided by the language's grammar or type system. As a result, suggestions provided with respect to queries specified in a first language can be confined to operations supported by a second language, among other things. Furthermore, it is to be appreciated that errors in query specification can also be identified to a user (e.g., red squiggly underscore) via the interface component 410 based on the state machine component 130.

What follows is a more detailed discussion of state machine construction to aid clarity and understanding with respect to aspects of the disclosed subject matter. It is to be appreciated that specific details provided below are for the aforementioned purpose and are not intended to implicitly limit the claimed subject matter in any way. In any event, the discussion begins by describing how target query language constraints can be identified from grammars and encoded within a type-based state machine. Next, the discussion addresses how minimal queries can be captured by confining enumeration to intermediate types. Further discussion pertains to distinguishing between entity types and query formulation types and generation of domain-specific data types for use in query formulation. Next, cross-clause state tracking is described wherein particular query formulation types are introduced to track usage of operators and optionally their parameters. Finally, code generation for specialized query types is described.

Starting from a target query-language specification, in terms of a grammar, available query operators can be identified. For example, the fragment below illustrates the specification of a query language in terms of its optional and mandatory operators, their relative order, and the occurrence count permitted (e.g., in terms of Kleene closure operators):

```
query ::= SELECT [TOP n] projection FROM source [WHERE filter]*
    [ORDER BY key [, key ] ]
projection ::= * | columns
source ::= <table name>
filter ::= <separate predicate expression grammar>
key ::= column [DESC | ASC]
columns := column | column, columns
column ::= <column name>
```

From the above, restrictions can be derived manually, automatically, or semi-automatically about the target query language. For example, it can be determined that:

Entire clauses in the query language are optional. Some of those are immediately apparent due to the [optional] notation, while others require some domain-specific knowledge. In particular, a "SELECT *" effectively means "no projection," so the use of the "SELECT" clause is optional from a semantic point of view.

Some clauses allow only one occurrence while others allows multiple—possibly a bounded number of—occurrences. In the above grammar, "WHERE" can be used any number of times while "ORDER BY" has at most two occurrences indicated by the nested use of optional comma-separated keys.

While in the target language certain clauses seem intermingled (such as "SELECT" with its nested "TOP" clause), those can often be split into separate query operators (also called sequence operators). In the above, "TOP" can be turned into a "Take" operator, which is distinct from the "Select" operator.

Order of query operators may have a semantic influence, depending on the target query language. For the above grammar, the relative order between "WHERE" and "ORDER BY" clauses do not matter, though the "TOP" row count restriction clause is really applied at the end after filtering, ordering and projection has taken place. Accordingly, the equivalent "Take" operator can appear solely at the end.

Given the knowledge gained from a-analyzing the query language grammar, a state machine can be produced encoding the relative order of single query operator invocations. This solution differs fundamentally from the use of conventional query operators providing interfaces such as "IQueryable<T>," where an endless, unbounded composition of query operators can be used to specify a query. For example, with an "IQueryable<T>" based solution, one would be able to write the following query expression in C#®:

```
(from product in products.Take(100)
  where product.Price > 1000
  orderby product.Price descending, product.Name, product.UnitsInStock
  from order in product.Orders
  select new { product.Name, order.Customer }).Skip(5)
```

If this query expression is to be translated into the target query language described by the aforementioned exemplary grammar, there are many problems, for example:

The use of the "Take" operator occurs in a position unsupported by the target language. More specifically, as stated earlier with respect to target query-language analysis, the corresponding "TOP" constraint will restrict the number of rows after the other query clauses have been processed. Clearly, the use of "Where" and "Take" does not commute.

Three "orderby" keys have been specified, while the target language only supports two. Notice other problems may arise around the use of "orderby," for example if only one sort order, such as "ascending," is permitted. In such a case, the use of the "descending" keyword should be rejected.

A second data source is being queried inside the same query, effectively realizing some kind of join between "products" and "orders." The sample target query-language does not provide direct support for such an operation and hence multiple from clauses should be rejected.

The "Skip" operator is not supported in the target language. This is a common issue with query providers that use the full-blown "IQueryable<T>" interface while the query language being targeted typically only supports a handful of query operators.

In order to restrict the expressiveness of language integrated queries one should realize those query are simply syntactical sugar on top of chains of method calls, where the targeted methods are known as query operators. In particular, the language does not care where those methods are implemented as regular method resolution rules apply. As an example, the query syntax shown above translates into the following chain of method calls, where clauses are sometimes turned into the use of lambda expressions:

```
products
  .Take(100)
  .Where(product => product.Price > 1000)
  .OrderByDescending(product => product.Price)
  .ThenBy(product => product.Name)
  .ThenBy(product =>product.UnitsInStock)
  .SelectMany(product =>product.Orders, (product, order) =>new{
  product.Name, order.Customer })
  .Skip(5)
```

By restricting the availability of some of the methods (in a way discussed further on) in the translation above, a compiler or like mechanism can signal an error at compile-time, hence preventing the user from writing a query expression that will not be supported by the target language. In the above, the methods that should not be allowed given the previously provided exemplary grammar are underlined.

To realize this restrictive effect, supported query operator usage paths can be analyzed through the target query language grammar, for example, and turned into a state machine of types (also referred to herein as a type-based state machine). After every use of a query operator (e.g., an edge in the state machine), further uses of query operators can become restricted. In the sample above, the first invocation of "ThenBy" should not allow any further uses of "ThenBy" as there can only be two ordering clauses specified. At the end of certain paths through the grammar, further operator uses can be disallowed at which point a user cannot do anything but invoke the computation of the query results. This corresponds to final states in the state machine. For example, in the sample above, the use of "Take" should not allow any further uses of query operators.

The following mapping onto state machine terminology can apply:

Nodes correspond to types that represent a (possibly intermediate) querying operation. Those types capture the history of operators including the order of the operators that have been used so far, for instance in a nominal way (e.g., the name of the type encodes the operations that have been used already). Based on this information, further moves (edges) can be restricted.

The start node of the state machine represents a queryable data source, exposing the initial query operators as methods (edges) that are permitted to be used.

Final nodes do not have any further query operators exposed but can trigger execution of the query. Intermediate nodes may or may not be able to trigger execution of the query (e.g., one may need to specify at least one where clause before a query can be run).

Edges correspond to the methods on types, representing query operators that are permitted to be used at this stage of the query expression, based on the history captured in the node type. Those methods can follow the signatures of query operators so that query syntax can target them.

Self-referential nodes through loop edges represent query operators that can be used any number of times (corresponding to the Kleene closure "*" operator), starting from the current state (node) in the state machine.

For query operators only allowing a set number of uses (e.g., the "ORDER BY" count limitation in the running sample), intermediate nodes can be introduced for every use, effectively carrying a usage count encoded in the type. Furthermore, the state machine can capture relative ordering of query operators since not all operators commute. For example, specifying a "Take" operator after a "Where" operator can yield different results than specifying a "Where" operator after a "Take" operator.

Figure 5:
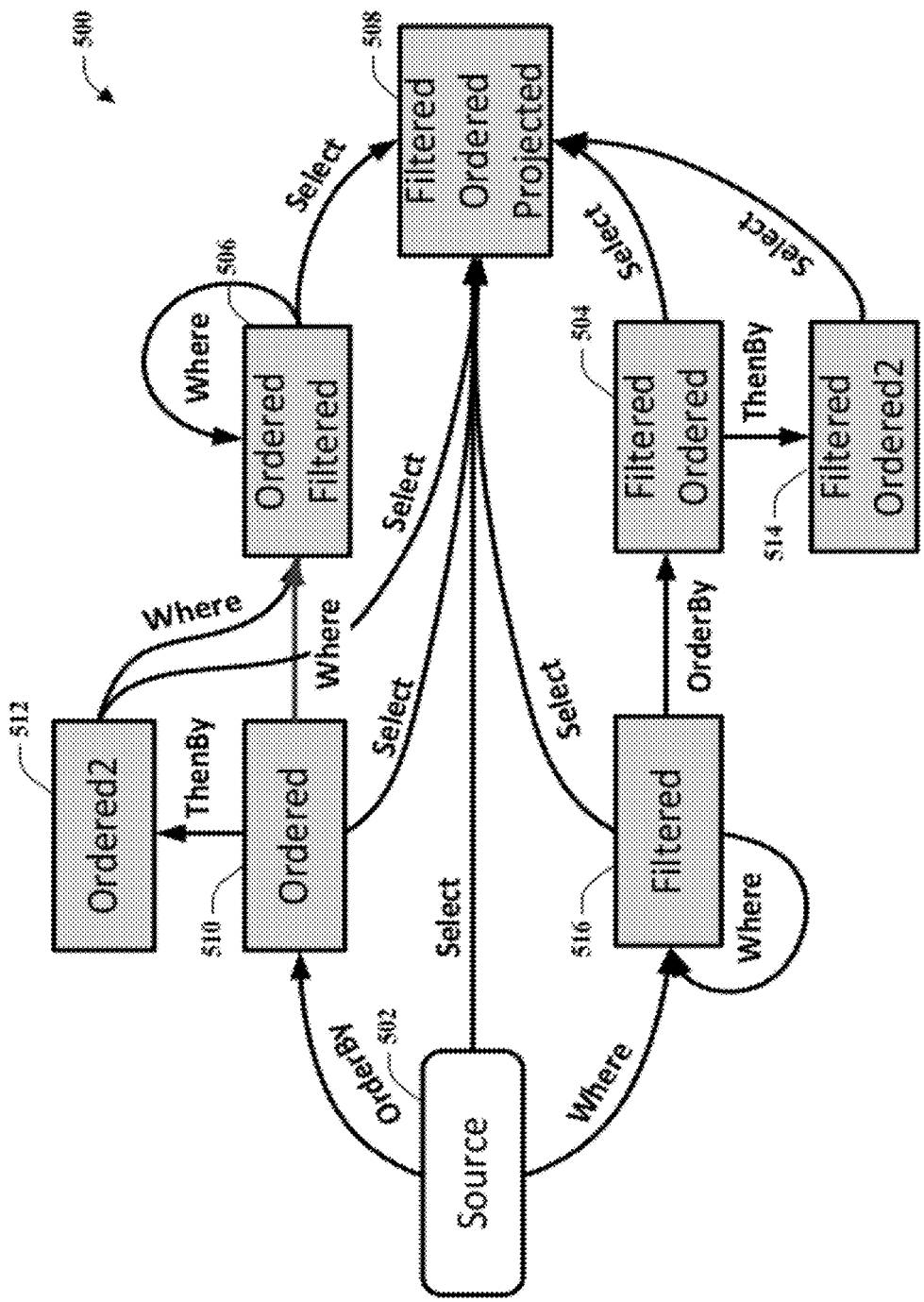
FIG. 5 is an exemplary state machine graph.

Turning attention to FIG. 5, an exemplary state machine graph 500 is provided to concretize some of the above description. For simplification purposes only, a subset of query operators are employed in the type-based state machine graph 500, focusing on "OrderBy," "Where," and "Select."

Here, the "Source" node 520 (represented as a type) acts as the start of the state machine graph and has three outgoing edges (each of which are represented as methods): "OrderBy," "Where," and "Select." Type names for intermediate nodes express the information about the query expression captured so far. For example, when following the "Where" and "OrderBy" edges starting from "Source" node 502, one gets a "FilteredOrdered" node 504 or "OrderedFilter" node 506, which includes both the filter clause and the ordering key selector. Notice some nodes can be reused even when only partial information is available; e.g. "FilteredOrderedProjected" node 508 can be reached by following the "Select" edge from the "Source" node 502. In this case, the filter will be the constant true-returning function and the list of keys used for ordering will be empty.

To limit the number of ordering clauses that can be specified, separate nodes can exist to count down the number of remaining operator uses that are permitted. In this case, "OrderBy" specifies the first key selector and can be followed by one and only one more "ThenBy" call to specify a secondary ordering. "Ordered" node 510 and "Ordered2" node 512 reflect the states where no further "ThenBy" operators can be used. In case three key selectors would be permitted, an "Ordered3" node would be added. A similar situation occurs with respect to "Filtered Ordered" node 504 and "Filtered Ordered2" node 514 reached from "Filtered" node 516.

Permutations of commuting operators are created. For example, "OrderBy" and "Where" can be swapped, giving rise to two separate paths through the state machine graph 500. This allows maximum flexibility for the end-user when writing down the query since the language compilers conventionally do not reorder operators into some normal form. The corresponding methods are simply called in the order the query operator keywords are used.

In this sample state-machine graph 500, the "Filtered Ordered Projected" node 508 is the final node. Accordingly, further query operators are not permitted to be added. Since queries cannot be nested in the running sample, there is no way in the target query language to perform a filter after a representation-changing projection has been made, for example.

Another requirement or constraint introduced by some query languages is to have a minimum query, typically to ensure some restrictiveness on the results of the original data source. For example, one may have to specify at least one filter before results can be gathered. This can be used by data providers to avoid huge data volumes transported to users over a network or to prevent stealing bulk loads of data. In such a case, a query lacking a filter will be rejected by the target execution environment. Such queries can be statically rejected if they do not meet this goal by making solely those intermediate nodes that have enough query information on them in the state machine to result in objects over which query execution triggering is permitted. For example, a result collection object can implement an enumerable or observable pattern or interface (e.g., abstract data type) for iterating over pull-based (e.g., in-memory, database . . . ) or push-based (e.g., events, asynchronous computations . . . ) data collections. When the enumerator or observable pattern is lacking on an object, a compiler or like mechanism can be configured not to allow iteration over the results represented by the (incomplete) query.

Figure 6:
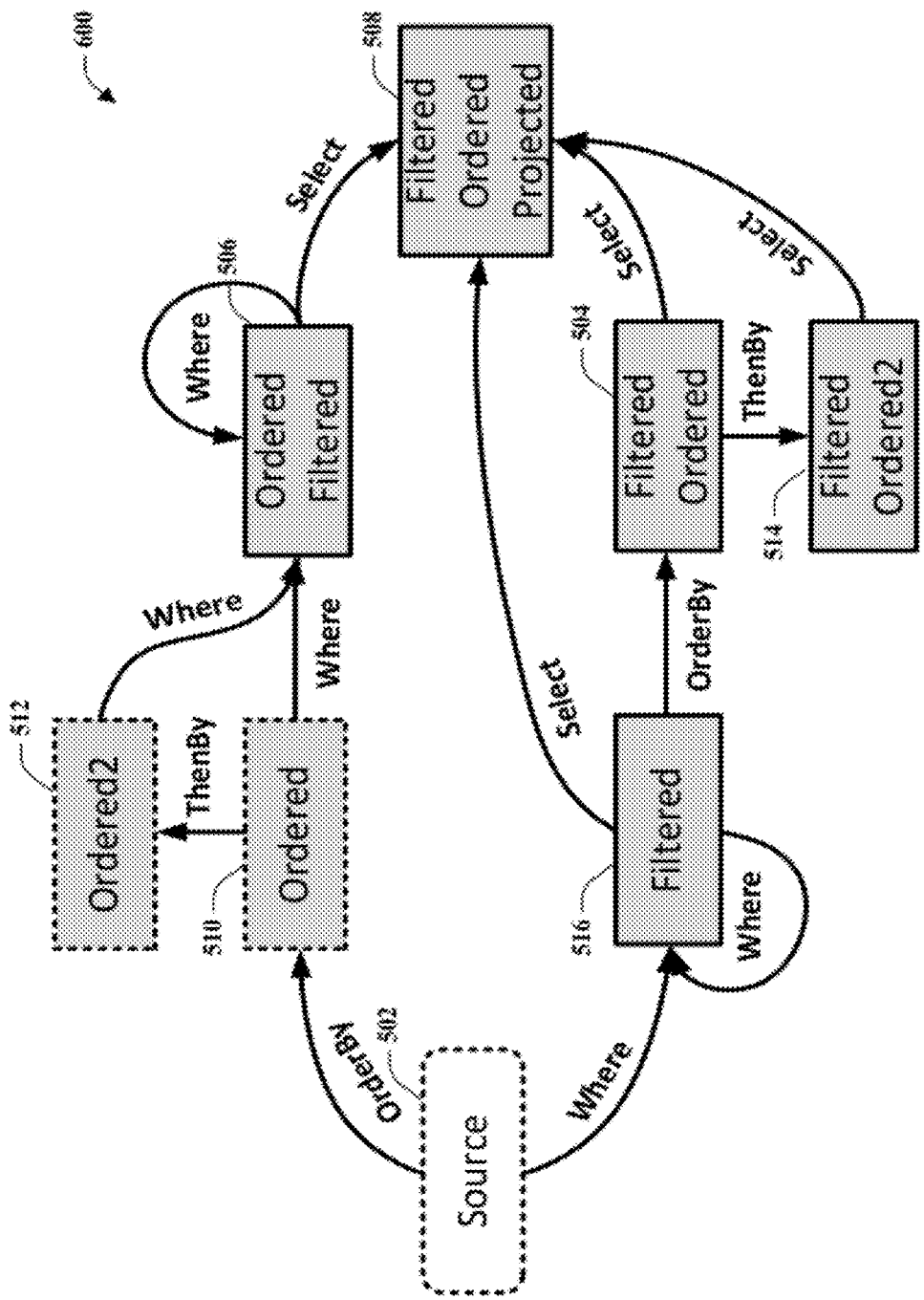
FIG. 6 is an exemplary state machine graph depicting enforcement of minimal queries.

Referring to FIG. 6, a state machine graph 600 is provided that is substantially the same as state machine graph 500 of FIG. 5 except, here, a case is illustrated where at least a single filter ("Where") is required before enumeration can take place. "Source" node 502, "Ordered" node 510, and "Ordered2" node 512 are shown with dotted borders to indicate that they are not able to trigger query execution. By way of example and not limitation, the nodes may not be allowed to iterate over results represented by a query. Notice also that some of the edges from the state machine graph 600 have been removed as well, since there is no point in allowing projection (which would transition into a final state) if no filter clause has been seen yet. In cases where at least a certain number of operator invocations have to take place before a query can be executed, intermediate nodes can be introduced to do such counting, as described earlier for the ordering case. In this setting, one could regard the enumerable nodes as final nodes in the state machine. For example, consecutive use of "OrderBy" and "ThenBy" does not result in an enumerable query object as no filter has been specified yet. On the other hand, following the "Where" edge starting from the "Source" node 502 yields an enumerable object at "Filtered" node 516.

The use of built-in interfaces for expressing queries mixes up two distinct concerns with regard to typing. One is the type of the objects exposed to the consumer of a query. For example, if one retrieves a "Person" object from a data source, it makes sense to expose the person's "Name" property as a regular string type, so that the object can be used like any other object (e.g., allowing calls to various methods on the object, such as "ToUpper"). This data type can be referred to as the "entity type."

On the other hand, the same entity type representing the data being queried is also used in the formulation of a query. This implies that operations available on the used data types (such as a string's "StartsWith" method) are also available for people to use while formulating a query. For example:

from p in people
where p.FirstName.StartsWith("B")
select p.FirstName + " " + p.LastName However, it may well be the case that the query language being targeted by the query provider does not support the "StartsWith" operation on strings in any way. Again, just as for unsupported query operators, the typical approach to formulating queries will put the burden of detecting unsupported constructs on the query provider (entity that translates the query from a first to a second language) which will detect such issues at runtime and signal them using exceptions that yield a suboptimal developer experience. By splitting the "entity type" from "query formulation types," this situation can be improved significantly.

Translating the code fragment for the query expression above into its method-based form yields the following:

```
people
    .Where(p => p.FirstName.StartsWith("B"))
    .Select(p => p.FirstName + " " + p.LastName)
```

While typically the lambda expression parameter "p" has the same type in both lambda expressions, this does not have to be the case. In addition, a lambda expression does not have to be typed as the verbatim "entity type" for the elements in the collection being queried. Accordingly, if restrictions apply to the target query-language grammar available in the filter clause and the project clause (which may have distinct capabilities), this can be modeled using specific query formulation types for p in the different lambda expressions. Instead of going with full-blown expression trees (supported directly through the language as a homoiconic property for lambda expressions), a domain-specific expression language can be built. To make it as friction-free as possible to use, operator overloading can be employed.

For example, in the filter above, if "p" were to be a "Person" type defined as follows, a "Where" method taking a "Func<Person, bool>" filter delegate would allow any expression to be written that results in a Boolean:

```
class Person
{
    public string FirstName { get; set; }
}
```

Examples of correct filters include "p=>true," "p=>false," "p=>"Joe"=="Adam"." Since those filters are not using parameter "p," they can be compiled away completely. This illustrates how the return type of the filter being a Boolean does not really provide any restrictions on what the user can write. More useful filter clauses will likely use "p" to express filtering conditions on some of its properties, for it to be translated into the target query language. Since "FirstName" in the sample is typed to be "string," any Boolean expression based on it will be accepted at compile time for use in the query expression, for example "p=>p.FirstName.ToUpper( )EndsWith("t")." Nevertheless, it may well be the case that the target language does not support "ToUpper," "Ends With," or a combination of those.

By introducing domain specific data types for use in query formulation, this issue can be avoided. For example, to reduce the operations available on a string property (e.g., representing a column in the data source), a specific string type can be introduced with only the supported operations for use in a query:

```
class FilterablePerson
{
    public FilterableString FirstName { get; set; }
}
```

The exposed "FilterableString" type will now contain only the permitted operations, returning types within the closed world of acceptable types used in a filter expression:

```
class FilterableString
{
    public FilterableBoolean StartsWith(FilterableString prefix) { ... }
    public static implicit operator FilterableString (string value) { ... }
}
```

In here, an implicit conversion is allowed from a standard string to a "FilterableString" to provide a smooth way to use literals. The return type of the "StartsWith" method now is a "FilterableBoolean" which has overloaded operators for the Boolean operations that are permitted:

```
class FilterableBoolean
{
    public static FilterableBoolean operator &( FilterableBoolean left, FilterableBoolean right) { ... }
    public static bool operator false(FilterableBoolean b) { return false; }
    public static implicit operator FilterableBoolean(bool value) { ... }
}
```

Overloading the false operator in the sample above allows one to get a call to the "&" operator, even when the "&&" operator is used. This is based on the translation for "&&" carried out by the compiler. The importance of this technique is to be able to build up domain-specific expression trees from inside the various methods, for example:

```
public FilterableBoolean StartsWith(FilterableString prefix) { return FilterableBoolean(new StartsWith(this, prefix)); }
``` where the "StartsWith" type is a simple data type containing two properties for the left-hand side and right-hand side of the "StartsWith" operation. Types representing operations available in queries include a representation of the query a user wrote, ready for translation into the target query language. Since those expressions end up behind lambda abstractions, all the query translator needs to do (triggered by enumeration on the resulting query object) is execute the anonymous method delegate that was created for the lambda by feeding it a query formulation type. For example:
Definition Site (User Code):

```
.Where(p => p.FirstName.StartsWith("B"))
```

Translation Site (Framework Code):

```
Filtered<T> Where(Func<T, FilterableBool> filter) {
    return new Filtered<T>(this, filter); // still delayed
}
class Filtered<T> : IEnumerable<T>
{
    private Func<T, FilterableBool> _filter;
    ...
    public IEnumerator<T> GetEnumerator( )
```

```
    {
        // Translate and execute the query
        var filter = Translate(_filter(new T( )));
        ...
    }
}
```

Similar expressivity restrictions can be applied to other query operators, such as ordering where one typically should define a key selector that returns a column instead of a complicated expression. For example:

```
people
    .OrderBy(p => p.Age)
    .Select(p => p.FirstName + " " + p.LastName)
```

By defining the properties on the query formulation type to be derived from some common Column base class (or have them implement some interface), "OrderBy" can be defined to go from the query formulation type to a Column:

```
Ordered<T> OrderBy(Func<T, Column> keySelector)
{
    return new Ordered<T>(this, keySelector);
}
...
class StringColumn : Column { ... }
class IntColumn : Column { ... }
...
```

Now one can only specify key selectors that extract a single column to be used for ordering. Constructors to a query formulation type used in the translation of ordering clauses can initialize the column objects with a string literal or another internal representation for a reference to the underlying column. Subsequent uses of "ThenBy" operators can create new "Ordered<T>" objects containing a list of key selectors.

```
class Ordered<T> : IEnumerable<T>
{
    private List<Func<T, Column>> _keys;
    ...
    public IEnumerator<T> GetEnumerator( )
    {
        // Translate and execute the query
        var columnNames = from key in _keys select key(new T( )).Name;
        ...
    }
}
```

Some query clauses do not lend themselves to this technique because they typically are used to select one or more columns or even multiple computations over columns. For example, a projection operator like "select" may be fed a selector function that creates a new anonymous type to hold multiple values, for example:

```
people
    .Select(p => new { p.FirstName, p.LastName, p.Age })
```

In such a case, the lambda expression's return type cannot be restricted since there is no common base type for all possible projections. Additionally, projection is on the edge between query formulation and the definition of the shape of query results, so query formulation data types (like "StringColumn" or other domain-specific types) should not be allowed to leak out as they don't provide full-fidelity types that are flexible to use at the consuming end (like "System.String" with lots of locally supported operations). Data representation of a query such as expression trees built into the language can be used for such cases, with the drawback of having runtime checking of the expressions the user wrote.

Sometimes the use of certain expression constructs precludes certain further operations on a query expression. For example, in a query language where one can restrict results based on various predicates over certain entity object properties, it may be the case that one can only use certain such restrictive predicates once (or a few times). Consider the following query using multiple "Where" filters, operating on some data source with Twitter® Tweets®. In such a target query language it is often the case each kind of predicate can only be used once, for example one can only specify one restriction on "From":

```
tweets
    .Where(t => t.Location == "Seattle")
    .Where(t => t.From == "Mr. X")
    .Where(t => t.Posted > DateTime.Now - TimeSpan.FromDays(7))
```

Figure 7:
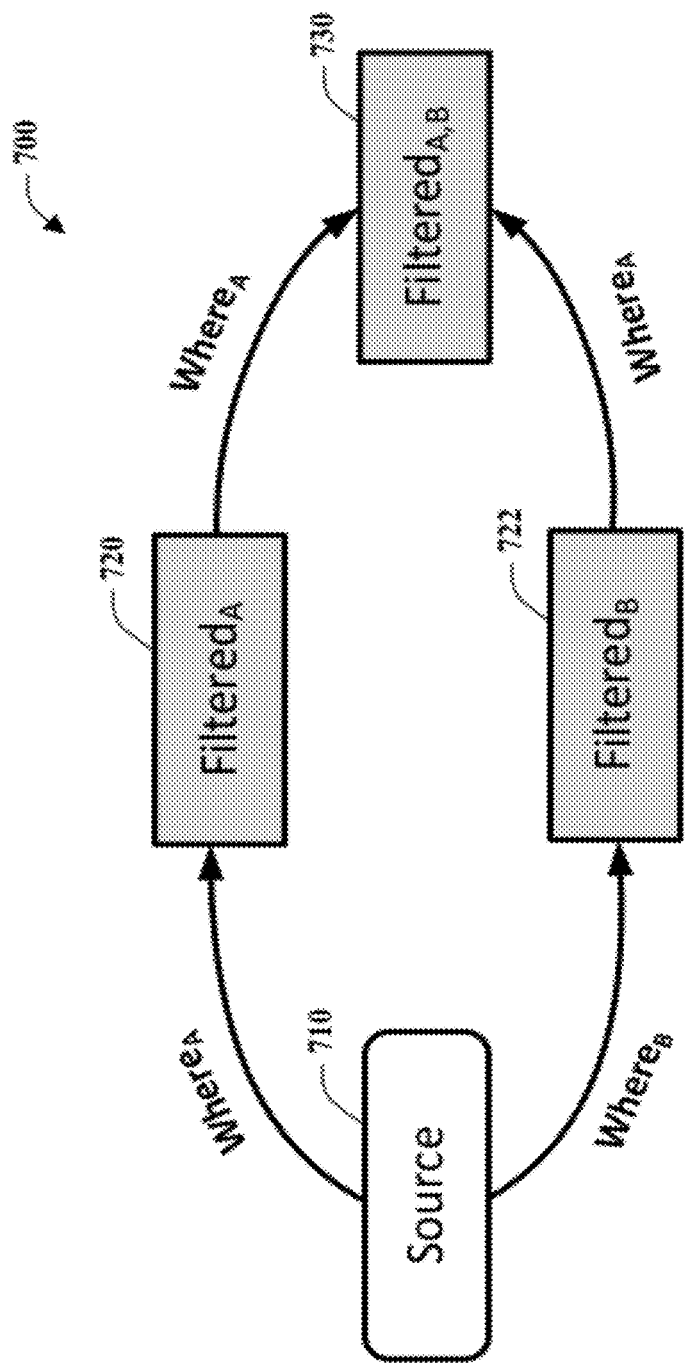
FIG. 7 is an exemplary state machine graph illustrating tracking of predicates across operations.

In this case, the use of a certain predicate limits operations downstream in the query syntax. One way to verify such limitations are met at compile-time is by introducing query formulation types that track what predicates have been used already. For example, referring to FIG. 7, a state machine graph 700 is illustrated that allows one to specify a number of "Where" operators in a row. As shown, from a "Source" node 710 two "Where" operators are specified "Where$_A$," and "Where$_B$,": producing corresponding filter nodes "Filtered$_A$" node 720 and "Filtered$_B$" 722. "Filtered$_{A,B}$" node 730 represents a type that tracks predicate usage.

For any number of possible predicates, permutations exist as paths through state machine graph 700. Each edge leaving a node represents an overload of a query operator, with a specialized predicate function. Based on the overload chosen, the return type of the operator method determines further possible operations. In essence, the return types of operators encode not only the history of which operators have been used but also of the predicates (or key selectors, projection . . . ) used within those operators. For example, the "Source" node 710 in state machine graph 700 has two overloads for Where:

```
class Source
{
    public FilteredByA<T$_A$> Where(Func<T, FilterByA> predicate)
    { ... }
    public FilteredByB<T$_B$> Where(Func<T, FilterByB> predicate)
    { ... }
}
```

In here, type "T" stands for a query formulation type, for example a Tweet® in the sample mentioned above. Any predicate based on a given exposed property on this type results in a "FilterBy*" result. For example:

```
class FilterableTweet
{
    public TweetLocationForFiltering Location { get; }
    public TweetSenderForFiltering From { get; }
```

```
    public TweetDateForFiltering Posted { get; }
}
```

Here, the "FilterableTweet" type is used on "Where" predicate arguments only, typing the various properties using "*" primitive data types that encode the property use and are restricted to filtering operations only (hence the "Tweet*ForFiltering" naming pattern). An example of such a type is shown below:

```
class TweetLocationForFiltering
{
    public FilterByLocation StartsWith(string prefix);
    public static FilterByLocation
operator ==(TweetLocationForFiltering column, string location);
    // other operations within the grammar supported for filters over
"location"
}
```

In this case, complete predicates will be typed as "FilterByLocation," while predicates expressed over, say, "Sender" will be typed using a particular type "FilterBySender," etc. When the user formulates a query over the source, a predicate expression will be written which has one "FilterBy*" result type, allowing the compiler to choose the most specific overload, for instance:

```
tweets
    .Where(t => t.Location == "Seattle")
``` returns an object of type "FilteredByLocation." This type on its turn has "Where" overloads that allow further specification of additional predicates, but this time without giving a predicate over "Location" as an option. This is achieved by having a new query formulation type used as the argument to the "Where" predicate lambda expression.

Figure 8:
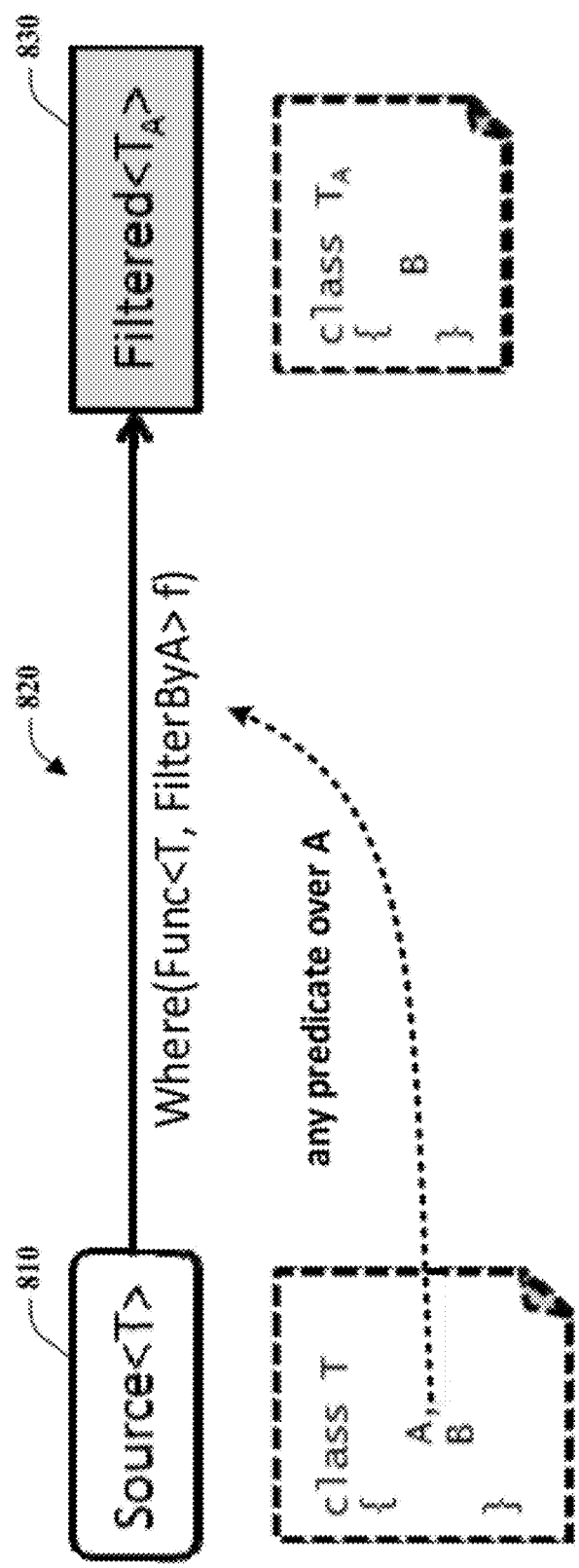
FIG. 8 is a graphical illustration of typing for query operator results and filter expressions.

Turning attention briefly to FIG. 8, a graphical illustration of typing for query operator results and filter expressions. In general terms, where the original source 810 had a query formulation type "T," after using a filter 820 that restricts based on column "A," a new query formulation type "T\{A}" 830 is used for further filtering operations. For the running sample, this leads to the following experience while formulating a query:

```
tweets
.Where(t => t. // Shows Location, From, Posted as available options
→
tweets
.Where(t => t.Location == "Seattle")
.Where(t => t. // Shows From, Posted as available options
```

The "FilteredBy*" types carry information about the expressed predicates in terms of the lambda expression that was written by the user. When the query's execution is triggered, those lambda expression delegates can be executed to obtain the "FilterBy*" objects that wrap up the information about the written predicate (e.g., using techniques for custom domain-specific expression trees described earlier).

Previous discussion pertained to how the number of operator users can be restricted. Above, it is noted that the same operator (e.g., Where) can be used multiple times, but with each kind of predicate at most once. Generalized, "FilterByLocation" could indicate a single use of a location-based filter, while still permitting another filter on location. Again, the number of uses could be tracked in a type.

Whether or not an entity type representing objects being queried over is fixed (e.g., for Twitter there's only one fixed data type that can be represented as a Tweet type; versus ad-hoc table definitions in systems like SQL or SharePoint®), given a grammar for the query language and possible expressions used therein (e.g., for predicates, projections . . . ), one can generate intermediate types that provide for a tight domain-specialized query formulation. This includes:

Generation of the top-level state machine tracking operator use and valid use patterns Generation of query formulation types representing entities being queried over Generation of sets of expression tree types to restrict possible query operations to "remotable" expressions (expressions that are transmitted across application boundaries)

Generation of entity types for the objects that represent the results of querying (full-fidelity local typing)

Partitioning the query for parallel execution over a network of machines (e.g., Cloud)

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanisms can be employed by the generation component 220 to aid production of a state machine including determining or inferring an appropriate size and/or complexity of the state machine.

Figure 9:
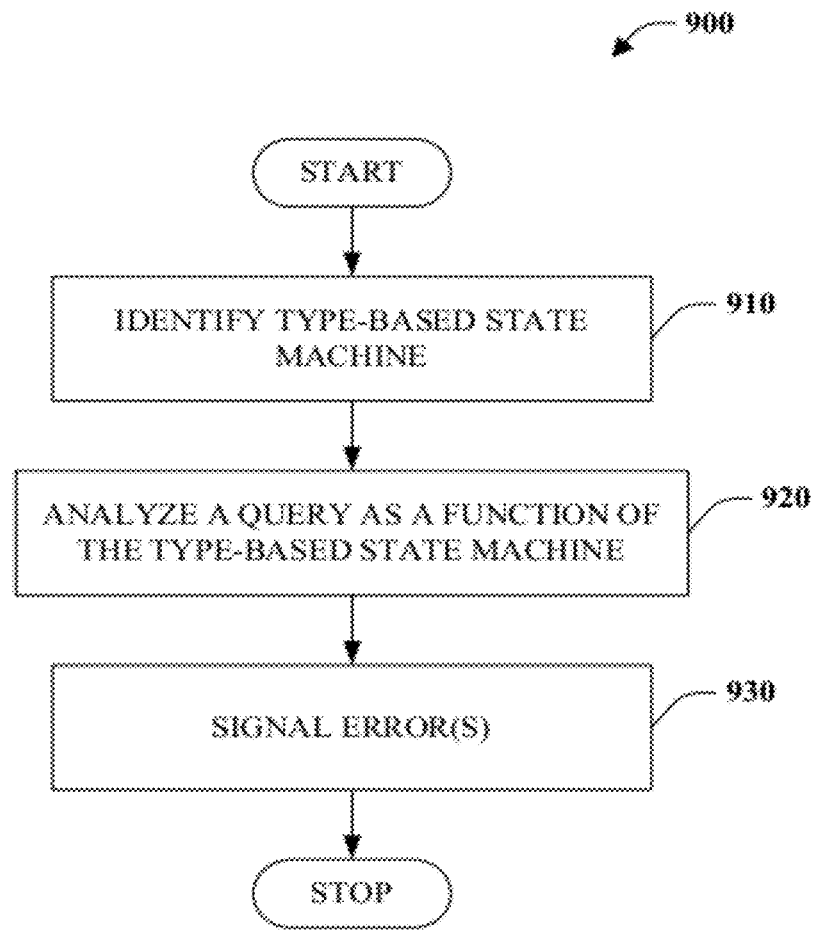
FIG. 9 is a flow chart diagram of a method of query analysis.
Figure 10:
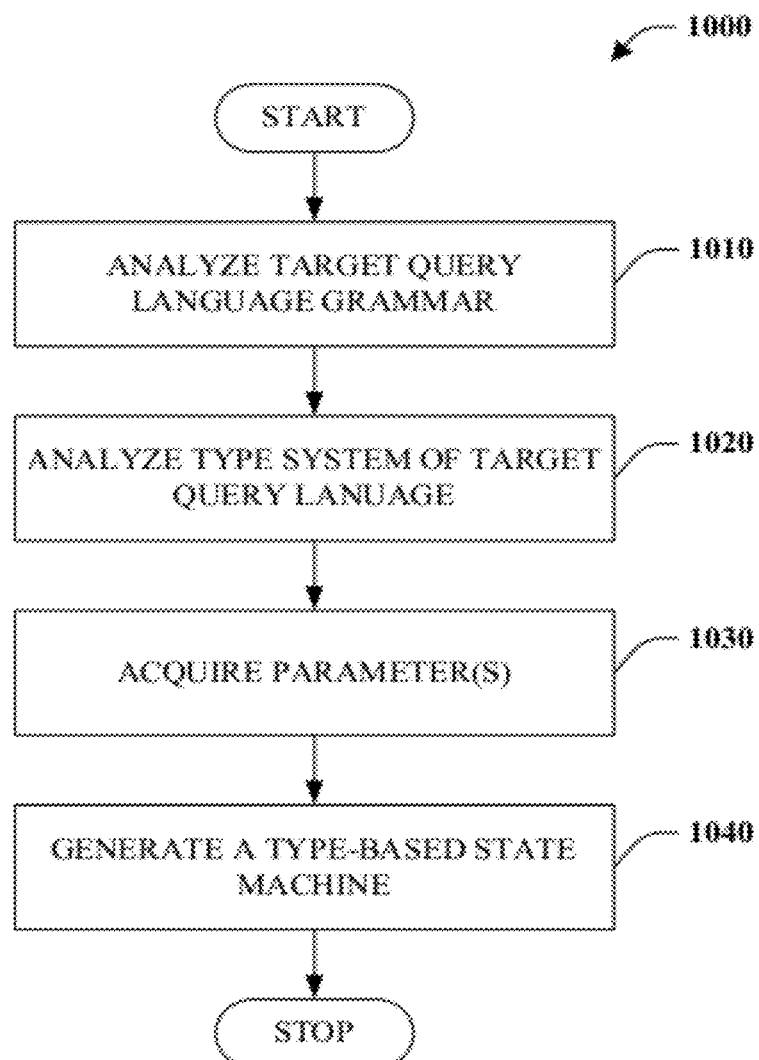
FIG. 10 is a flow chart diagram of a method of state machine generation.
Figure 11:
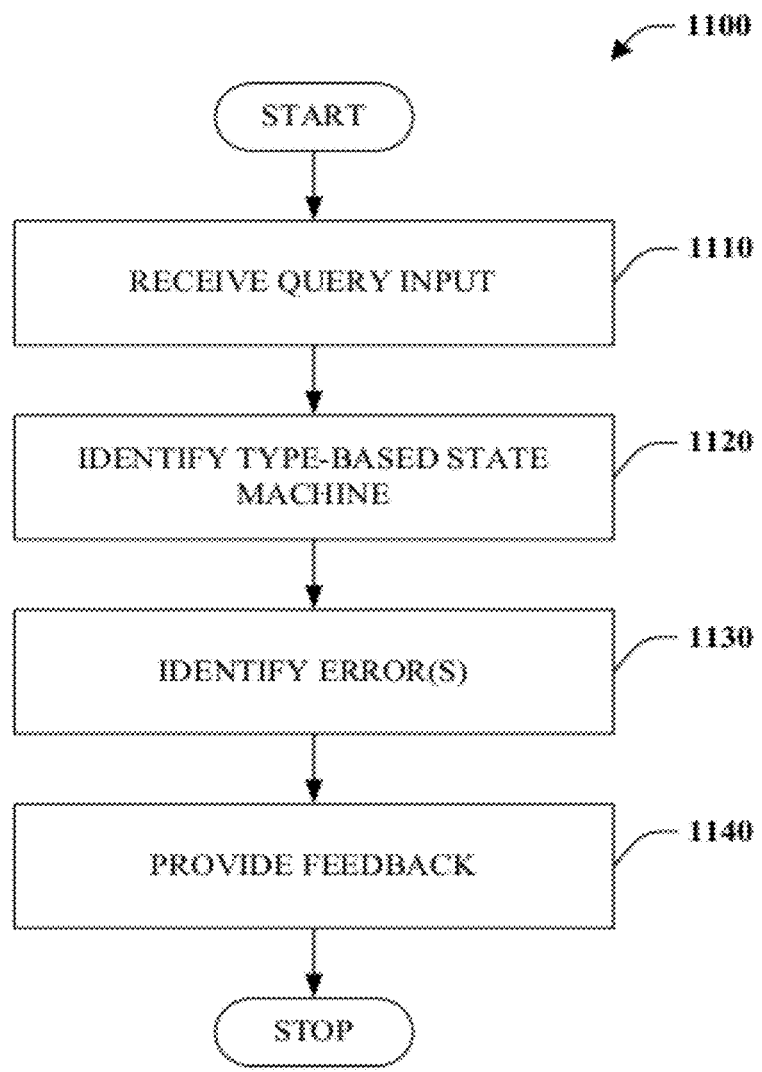
FIG. 11 is a flow chart diagram of method of facilitating specification of queries.

In view of the exemplary systems described supra, methodologies that may be implemented in accordance with the disclosed subject matter will be better appreciated with reference to the flow charts of FIGS. 9-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 9, a method of query analysis 900 is illustrated. At reference numeral 910, a type-based state machine is identified for a target query language, for example, wherein the type-based state machine captures query constraints or restrictions of the target query language in terms of types encoding states and methods encoding transitions between states. At reference numeral 920, a source query is analyzed as a function of the type-based state machine to determine whether the source query is a valid query in the target query language. At numeral 930, one or more errors are signaled if the source query is not fully supported by the target query language, for example upon detection of an invalid query operator or invalid pattern of query operators. In accordance with one embodiment, the method of query analysis 900 can be captured by a compiler. Furthermore, since constraints are captured by types, a compiler's type checker can exploited to determine whether a source query is valid or invalid.

FIG. 10 illustrates a method of state machine generation 1000. At reference numeral 1010, a target query-language grammar (e.g., context-free grammar) is analyzed to determine constraints or restrictions of the query language. For example, the supported query operators can be determined as well as an upper limit on the number of occurrences and relative orderings of the query operators. At numeral 1020, a type system for the target query language can be analyzed to determine type rules, which can identify types of values that can be computed in various manners. As simplistic example, a type rule can indicate that only values of type integer can be added together rather than an integer and a button for instance. At reference numeral 1030, parameters can be received, retrieved, determined, or inferred regarding the size and/or complexity of a state machine. For example, a type-based state machine may be generated to reflect all constraints of a target query language, a subset of constraints, or a superset of constraints for instance based on a given version, payment of a fee, or as a function of a cost/benefit analysis, among other things. At reference numeral 1040, a type-based state machine is generated as a function of the language grammar and/or type system as well as particular parameters governing size and/or complexity, wherein the constraints are encoded in terms of types as states and methods governing transitions between states or in other words types.

FIG. 11 is a flow chart diagram of a method of facilitating specification of queries. At reference numeral 1110, a query input is received for example from a code editor alone or injunction with an integrated development environment. Here, the query can correspond to a query specified in a source programming language that is destined to be translated into a query in a target programming language. For example, the query can be specified as a language-integrated query syntax within an object-oriented programming language (e.g., C#®, Visual Basic® . . . ) that is subsequently translated or transformed to SQL (Structured Query Language) for execution against a relational database. At reference numeral 1120, a type-based state machine is identified for the target query language, which represents constraints, at least on syntax, as types and methods corresponding to states and transitions between states, respectively. At numeral 1130, errors are identified as a function of the received query input and the type-based state machine. In accordance with one embodiment, a compiler type checker can identify unsupported query features as static type errors. At numeral 1140, feedback can be provided to a programmer to aid specification of the input query. In one instance, errors or unsupported query features can be identified, for example with a colored squiggly line. Additionally, such feedback can correspond to suggestions for example with respect to code completion.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the verb forms of the word "remote" such as but not limited to "remoting," "remoted," and "remotes" are intended to refer to transmission of code or data across application domains that isolate software applications physically and/or logically so they do not affect each other. After remoting, the subject of the remoting (e.g., code or data) can reside on the same computer on which they originated or a different network connected computer, for example.

To the extent that the term "query expression" is used herein, it is intended to refer to a syntax for specifying a query, which includes one or more query operators that map to underlying language primitive implementations such as methods by the same name.

Unless otherwise noted, the term "semantics" as used with respect to a program language (e.g., "program language semantics," "language semantics" . . . ) is intended to be interpreted broadly to encompass the form, specification, or form of specification of a language. In this manner, both type rules and syntax are aspects of semantics as well as computational complexity, among others things.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 12:
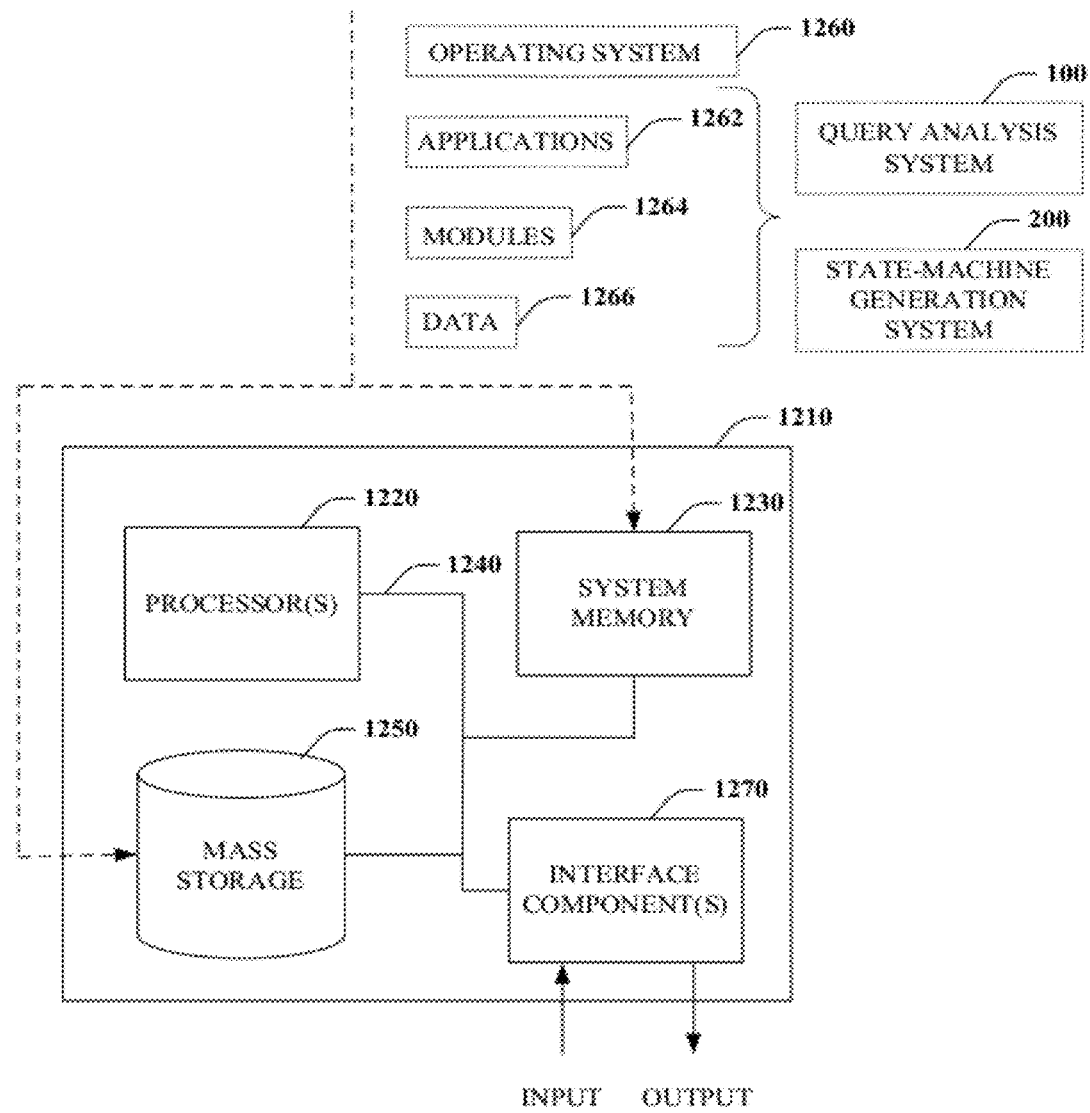
FIG. 12 is a schematic block diagram illustrating a suitable operating environment for aspects of the subject disclosure.

In order to provide a context for the claimed subject matter, FIG. 12 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 12, illustrated is an example computer 1210 or computing device (e.g., desktop, laptop, server, hand-held, programmable consumer or industrial electronics, set-top box, game system . . . ). The computer 1210 includes one or more processor(s) 1220, system memory 1230, system bus 1240, mass storage 1250, and one or more interface components 1270. The system bus 1240 communicatively couples at least the above system components. However, it is to be appreciated that in its simplest form the computer 1210 can include one or more processors 1220 coupled to system memory 1230 that execute various computer executable actions, instructions, and or components.

The processor(s) 1220 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1220 may also be implemented as a combination of computing devices, for example a combination of a DSP and a microprocessor, a plurality of microprocessors, multi-core processors, one or more microprocessors in conjunction with a DSP core, or any other such configuration.

The computer 1210 can include or otherwise interact with a variety of computer-readable media to facilitate control of the computer 1210 to implement one or more aspects of the claimed subject matter. The computer-readable media can be any available media that can be accessed by the computer 1210 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1210.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 1230 and mass storage 1250 are examples of computer-readable storage media. Depending on the exact configuration and type of computing device, system memory 1230 may be volatile (e.g., RAM), non-volatile (e.g., ROM, flash memory . . . ) or some combination of the two. By way of example, the basic input/output system (BIOS), including basic routines to transfer information between elements within the computer 1210, such as during start-up, can be stored in nonvolatile memory, while volatile memory can act as external cache memory to facilitate processing by the processor(s) 1220, among other things.

Mass storage 1250 includes removable/non-removable, volatile/non-volatile computer storage media for storage of large amounts of data relative to the system memory 1230. For example, mass storage 1250 includes, but is not limited to, one or more devices such as a magnetic or optical disk drive, floppy disk drive, flash memory, solid-state drive, or memory stick.

System memory 1230 and mass storage 1250 can include, or have stored therein, operating system 1260, one or more applications 1262, one or more program modules 1264, and data 1266. The operating system 1260 acts to control and allocate resources of the computer 1210. Applications 1262 include one or both of system and application software and can exploit management of resources by the operating system 1260 through program modules 1264 and data 1266 stored in system memory 1230 and/or mass storage 1250 to perform one or more actions. Accordingly, applications 1262 can turn a general-purpose computer 1210 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the query analysis system 100 and state-machine generation system 200 can be or form part of part of an application 1262, and include one or more modules 1264 and data 1266 stored in memory and/or mass storage 1250 whose functionality can be realized when executed by one or more processor(s) 1220, as shown.

The computer 1210 also includes one or more interface components 1270 that are communicatively coupled to the system bus 1240 and facilitate interaction with the computer 1210. By way of example, the interface component 1270 can be a port (e.g., serial, parallel, PCMCIA, USB, FireWire . . . ) or an interface card (e.g., sound, video . . . ) or the like. In one example implementation, the interface component 1270 can be embodied as a user input/output interface to enable a user to enter commands and information into the computer 1210 through one or more input devices (e.g., pointing device such as a mouse, trackball, stylus, touch pad, keyboard, microphone, joystick, game pad, satellite dish, scanner, camera, other computer . . . ). In another example implementation, the interface component 1270 can be embodied as an output peripheral interface to supply output to displays (e.g., CRT, LCD, plasma . . . ), speakers, printers, and/or other computers, among other things. Still further yet, the interface component 1270 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of query analysis, comprising:
   employing at least one processor configured to execute computer-executable instructions stored in memory to perform the following acts:
   analyzing a query specified with a source programming language with respect to constraints of a target query programming language to determine validity of the query at compile time with a type-based state machine, wherein the type-based state machine is generated as a function of the target query programming language by encoding the constraints of the target query programming language in terms of data types as states and methods as transitions between the states.

2. The method of claim 1 further comprises generating the type-based state machine automatically from target programming-language semantics.

3. The method of claim 2 further comprises generating the type-based state machine from one of a grammar or type rules.

4. The method of claim 2 further comprises limiting computational complexity of the type-based state machine as a function of a parameter.

5. The method of claim 1 further comprises signaling an error upon detection of one or more invalid query operators or an invalid pattern of query operators.

6. The method of claim 5 further comprises signaling the error during query specification.

7. The method of claim 1 further comprises signaling an error upon detection of a failure to specify a minimal query.

8. The method of claim 1 further comprises suggesting valid query operators as the query is specified as a function of the type-based state machine.

9. A query analysis system, comprising:
   a processor coupled to a memory the processor configured to execute the following computer-executable components stored in the memory:
   a first component configured to validate a language-integrated query at compile time against a target query programming language with a type-based state machine, wherein the type-based state machine is generated as a function of a the target query programming language so that constraints of the target query language are encoded in terms of data types as states and methods as transitions between the states.

10. The system of claim 9, the type-based state machine encodes a portion of a grammar.

11. The system of claim 9, the type-based state machine encodes more constraints than provided by a grammar.

12. The system of claim 9, the type-based state machine captures a type system of the target query language.

13. The system of claim 9, the type-based state machine encodes a minimal query.

14. The system of claim 9, the first component is configured to signal an error upon detection one or more invalid query operators or of an invalid pattern of query operators.

15. The system of claim 9 further comprises a second component configured to provide suggestions for code completion as a function of the type-based state machine.

16. The system of claim 9 further comprises a second component configured to generate the type-based state machine from a grammar automatically.

17. A computer-readable storage medium having instructions stored thereon that enable at least one processor to perform a method upon execution of the instructions, the method comprising:
   generating a type-based state machine as a function of a target query programming language by encoding constraints of the target query programming language in terms of data types as states and methods as transitions between the states; and
   validating a query specified with a source programming language at compile time with the type-based state machine.

18. The computer-readable storage medium of claim 17, the method further comprises generating the state machine from a grammar of the target query programming language.

19. The computer-readable storage medium of claim 17, the method further comprises limiting size or complexity of the state machine as a function of a parameter.

20. The computer-readable storage medium of claim 17, the method further comprises encoding a type system of the query programming language in the state machine.

21. A computer-readable storage medium having instructions stored thereon that enable at least one processor to perform the following act:
   analyzing a query specified with a source programming language with respect to constraints of a target query programming language to determine validity of the query at compile time with a type-based state machine, wherein the type-based state machine is generated as a function of the target query programming language by encoding the constraints of the target programming language in terms of data types as states and methods as transitions between the states.

* * * * *